United States Patent
Ruia et al.

(10) Patent No.: US 7,685,367 B2
(45) Date of Patent: Mar. 23, 2010

(54) MULTI-CACHE COOPERATION FOR RESPONSE OUTPUT CACHING

(75) Inventors: Anil K. Ruia, Issaquah, WA (US); Erik B. Olson, Bountiful, UT (US); Michael Volodarsky, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 872 days.

(21) Appl. No.: 11/370,585

(22) Filed: Mar. 8, 2006

(65) Prior Publication Data

US 2007/0214320 A1   Sep. 13, 2007

(51) Int. Cl.
*G06F 13/00* (2006.01)

(52) U.S. Cl. ............................ 711/122; 711/119
(58) Field of Classification Search ............ 711/122
See application file for complete search history.

(56) References Cited

U.S. PATENT DOCUMENTS

| | | | |
|---|---|---|---|
| 5,386,547 A * | 1/1995 | Jouppi ............... | 711/122 |
| 5,758,119 A | 5/1998 | Mayfield et al. | |
| 5,924,116 A | 7/1999 | Aggarwal et al. | |
| 6,175,869 B1 | 1/2001 | Ahuja et al. | |
| 6,345,292 B1 | 2/2002 | Daugherty et al. | |
| 6,425,058 B1 | 7/2002 | Arimilli et al. | |
| 6,430,654 B1 | 8/2002 | Mehrotra et al. | |
| 6,438,652 B1 | 8/2002 | Jordan et al. | |
| 6,473,401 B1 | 10/2002 | Kong et al. | |
| 6,678,799 B2 * | 1/2004 | Ang ................... | 711/141 |
| 6,697,849 B1 | 2/2004 | Carlson | |
| 6,851,024 B1 | 2/2005 | Wilkes et al. | |
| 6,973,536 B1 * | 12/2005 | Jacobs et al. ....... | 711/119 |
| 7,124,249 B1 * | 10/2006 | Darcy ................ | 711/122 |

(Continued)

FOREIGN PATENT DOCUMENTS

GB   2345993   7/2000

(Continued)

OTHER PUBLICATIONS

Zahir Tari and Herry Hamidjaja School of Computer Science and Information Technology "A CORBA Cooperative Cache Approach with Popularity Admission and Routing Mechanism", 10 pages http://goanna.cs.rmit.edu.au/~zahirt/Teaching/cosc1174/herry.pdf.

(Continued)

*Primary Examiner*—Hetul Patel
(74) *Attorney, Agent, or Firm*—Workman Nydegger

(57) ABSTRACT

A method for caching data may be practiced, for example, in a computing environment including a server system that provides data to client systems. The server system includes a number of caches for storing data. The method allows a least expensive cache to first cache data or return data requested by a client. The method includes receiving data to be cached at a cache. The method further includes determining that the data has not been previously cached at a preceding cache. If the data has not been previously cached at a preceding cache the data is cached at the cache. Alternatively, requests for data may be received at a first cache. If the data is at the first cache, the first cache returns the data. If the data is not at the first cache, the request for data is forwarded to a subsequent cache.

11 Claims, 4 Drawing Sheets

U.S. PATENT DOCUMENTS

| | | |
|---|---|---|
| 2002/0143984 A1 | 10/2002 | Hudson Michel |
| 2002/0184403 A1 | 12/2002 | Dahlin et al. |
| 2004/0260769 A1 | 12/2004 | Yamamoto |
| 2005/0050164 A1 | 3/2005 | Burd et al. |
| 2005/0165735 A1 | 7/2005 | Lin et al. |
| 2005/0246347 A1 | 11/2005 | Kobayashi |
| 2006/0005202 A1 | 1/2006 | Tanaka |

FOREIGN PATENT DOCUMENTS

| | | |
|---|---|---|
| WO | WO 99/03047 | 1/1999 |

OTHER PUBLICATIONS

Vivek S. Pai Rice University "Cache Management in Scalable Network Servers", 139 pages A Thesis Submitted in Partial Fulfillment of the Requirements for the Degree Doctor of Philosophy Houston, Texas Nov. 1999 http://piglet.uccs.edu/~chow/pub/cdn/doc/RicePaiCacheLard.pdf.

Jaroslaw Pietrzykowski "Decision support tool for web cache management", pp. 57-68 Journal of Telecommunications and Information Technology Mar. 2002 http://www.itl.waw.pl/czasopisma/JTIT/2002/3/57.pdf.

* cited by examiner

MULTI-CACHE COOPERATION FOR RESPONSE OUTPUT CACHING

BACKGROUND

Background and Relevant Art

Computers and computing systems have affected nearly every aspect of modern living. Computers are generally involved in work, recreation, healthcare, transportation, entertainment, household management, etc. The functionality of computers has also been enhanced by their ability to be interconnected through various network connections.

Computing systems may request data from other systems. This data may be obtained in a number of different ways. For example, data may be obtained by retrieving the data from a repository such as a database or other data store. Data may also be created dynamically by a system providing data. For example, asp.NET available from Microsoft Corporation of Redmond, Wash., includes tools for dynamically creating web page data. Even an ordinary web server includes functionality for receiving arguments with a web page request for providing customized web page data based on the arguments in the web page request.

One way to increase performance of computing systems is by output caching requested data. Caching involves storing recently requested data in a location that is quickly retrievable when a subsequent request is made for the same data. For example, data may be cached in a physical memory of a computer system such that the data can be very quickly retrieved.

Various caching algorithms have been created to determine how the cached data is stored and retained. For example FIFO is an acronym for first in first out. In this scheme, data is cached in the cache location and when room needs to be created for additional cache items, the oldest items are removed from cache. Other schemes use predictive filters to determine what is cached and for how long.

Often, individual components of a computer system will each have their own cache components. For example, in the web server context, a stack exists with the operating system at the bottom of the stack, a web server on top of the operating system, and applications on top of the web server. One example of this is Windows operating system hosting an IIS server hosting an asp.NET framework, all available from Microsoft Corporation of Redmond, Wash. Each of the operating system, web server and applications include each their own cache. If each of these individual components cache data when working together to provide data to a client, redundant caching may be performed. This may result in resources being wasted. For example, by retaining redundant cached items in physical memory, the amount of physical memory available for caching other items is substantially reduced.

The subject matter claimed herein is not limited to embodiments that solve any disadvantages or that operate only in environments such as those described above. Rather, this background is only provided to illustrate one-exemplary technology area where some embodiments described herein may be practiced.

BRIEF SUMMARY

One embodiment is directed to a method of caching data. The method may be practiced, for example, in a computing environment including a server system that provides data to client systems. The server system includes a number of caches for storing data. The method allows a least expensive cache to first cache data requested by a client. The method includes receiving data to be cached at a cache. The method further includes determining that the data has not been previously cached at a preceding cache. If the data has not been previously cached at a preceding cache the data is cached at the cache.

Another embodiment described herein is directed to retrieving data from a cache. The method may be practiced for example, in a computing environment including a server system that provides data to client systems. The server system includes a number of caches for storing data. The method allows data to be retrieved from less expensive caches first. The method includes receiving a request for data at a cache. The method further includes determining if the data is available at the cache. If the data is available at the cache, the requested data is returned. If the data is not available at the cache, the request is forwarded to a subsequent cache.

Another embodiment described herein is directed to a computer readable medium having a number of data structures stored thereon. The number of data structures includes a number of caches including a first cache having a first speed and a second cache coupled subsequently to the first cache. The second cache has a second speed that is slower than the first cache. By being subsequently coupled to the first cache, the first cache receives data and requests for data prior to the second cache. The data structures further include a policy object. The policy object defines settings for the plurality of caches.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments herein may comprise a special purpose or general-purpose computer including various computer hardware, as discussed in greater detail below.

One embodiment described herein includes a cache topology where caches are connected with one another in a hierarchical fashion. In the topology, the fastest and/or least expensive caches are accessed first for either caching data or for retrieving cached data. If a particular cache is unable to cache a given set of data, or the given set of data is not available at the cache, the data, or request for data is passed to a subsequent cache. The subsequent cache may be slower or more expensive, but may include the functionality for caching the given set of data. The cache topology may include any appropriate number of caches connected in the hierarchical fashion, with the faster and/or cheaper caches being accessible before the slower and/or more expensive caches.

In one embodiment, policy information defining data to be cached may be available to the caches in the hierarchy. Thus, the caches in the hierarchy can reference the policy information, along with assessing the caches individual capabilities in determining if a given set of data should be cached at the cache.

Figure 1:
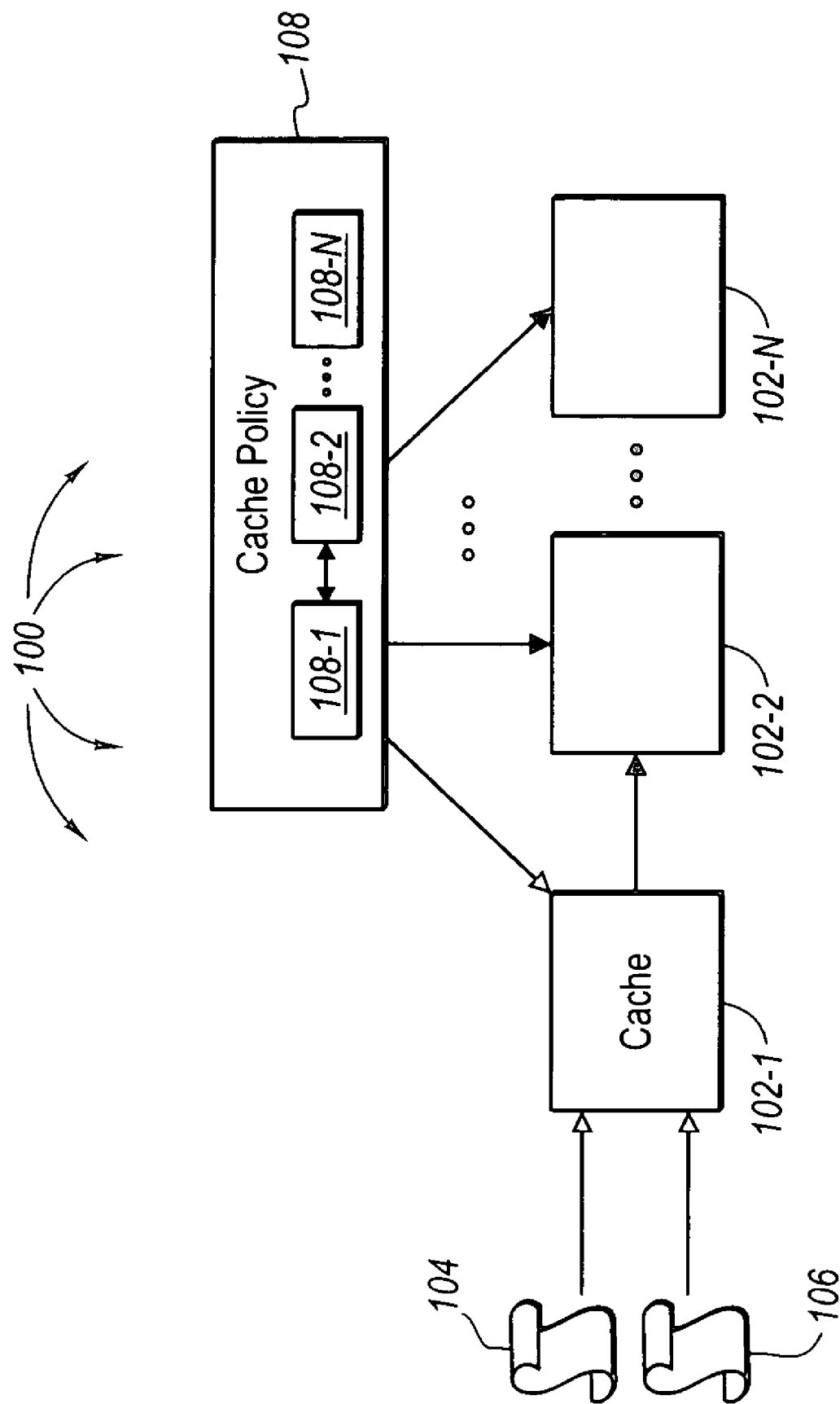
FIG. 1 illustrates a hierarchical organization of caches.

Referring now to FIG. 1, an illustrative example is shown where a cache topology 100 includes a number of caches 102-1, 102-2, and 102-N in a hierarchical arrangement. In the example shown a request for cached data 104 or data 106 to be cached may be sent to the first cache 102-1. For simplicity in explanation, a first example will now be given for the case when data 106 is sent to the first cache 102-1. When the data 106 is sent to the first cache 102-1 the first cache 102-1 can determine what type of data is being sent. The first cache 102-1 can then reference policy information 108 to determine if the data 106 should be cached. If the data 106 should be cached, the first cache 102-2 can then evaluate its own capabilities for caching data. If the data 106 is of a type that can be cached at the cache 102-1, then the data 106 will be cached at the first cache 102-1.

On the other hand, if the data is not of a type that can be cached by the cache 102-1, then the data will be forwarded to a second cache 102-2. The second cache 102-2 will perform similar actions to those performed by the first cache 102-1, such as referencing the policy information 108 to determine if the data 106 should be cached and evaluating its own capabilities to determine if it is able to cache the data 106. This process can be continued onto other caches represented by the ellipsis and 102-N until a cache has cached the data 106 or no caches have cached the data 106 after having been presented with the data 106.

A similar process may be performed for retrieving data. For example, a request for cached data 104 may be sent to the first cache 102-1. If the first cache 102-1 has the cached data, the cached data will be returned from the first cache 102-1. If the first cache 102-1 does not have the cached data, the first cache 102-1 will pass the request for cached data 104 to the second cache 102-2. This process can be continued through the caches represented by the ellipsis and 102-N.

As described previously, the fastest and/or least expensive cache may be the first cache 102-1 with the subsequent cache being slower and/or more expensive caches. For example, in one embodiment, the first cache 102-1 may be a cache for a lower level component such as a webserver. The second cache 102-2 may be a cache for a higher level component such as an application level component such as for example ASP.net available for Microsoft Corporation of Redmond, Wash. In this example, the first cache 102-1 may be a native cache and the second cache 102-2 a managed cache. Native caches typically are faster and cheaper than managed caches.

As described previously, FIG. 1 illustrates a cache policy 108. In some embodiments, the cache policy may include policy settings for each of the caches. For example, the cache policy may include a cache policy 108-1, 108-2, and 108-N which correspond to the caches 102-1, 102-2, and 102-N. The cache policies 108-1, 108-2, and 108-N, may be interconnected such that all cache settings are known within the cache policy 108. This allows any cache that is able, to cached data 106. Thus, the fastest and/or cheapest cache may be used to cache data when it is able to do so based on the cache's capabilities and the cache policy 108 including the cache policy for each of the caches.

In alternative embodiments, the cache policy 108 may be a generalized shared configuration that each of the caches 102-1, 102-2, and 102-N are able to reference. As such, the first cache of that has the capabilities to store data 106 as specified by the cache policy 108 will store the data 106. When a cache has stored the data 106, the data 106 may be marked such that subsequent caches do not attempt to cache the data 106. In one embodiment, this may be accomplished by simply marking the data 106 as data that should not be cached. In this way, the caches 102-1, 102-2, and 102-N do not need to be designed to specifically communicate with one another. Rather a preceding cache can mark data 106 as data that should not be cached thus preventing subsequent caches from caching the data. Additionally, the model shown in FIG. 1 is highly extensible in that any number of subsequent caches can be added without the need to specially design the caches to communicate together.

Figure 2:
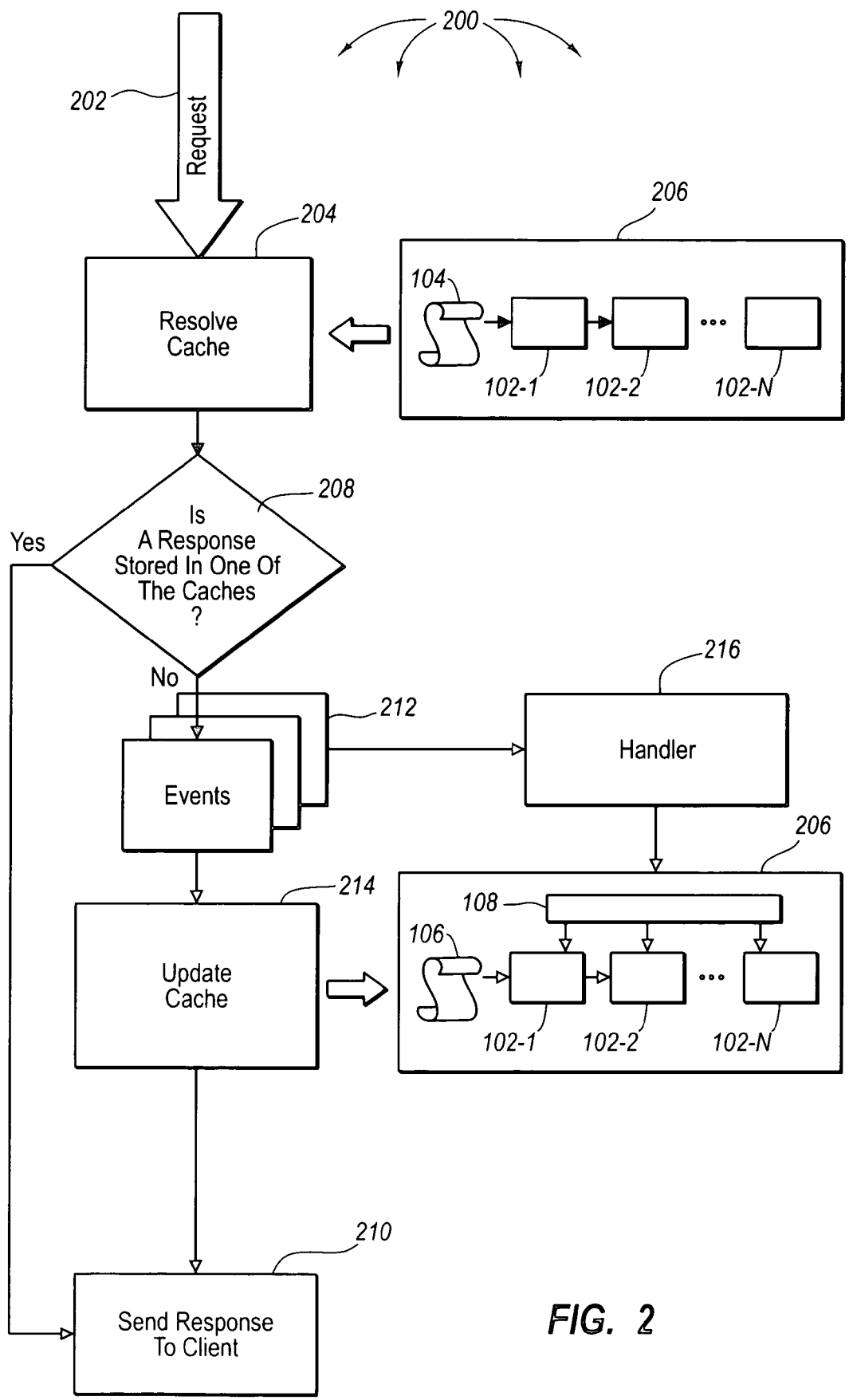
FIG. 2 illustrate a pipeline of activities for caching and requesting data.

Referring now to FIG. 2, a workflow pipeline 200 is illustrated. The workflow pipeline 200 illustrates a request 202 being received. The request 202 may be for example a request from a client system connected to a server system. If the request 202 can be handled by an output cache, then computing resources can be conserved by providing a response to the request 202 from a cache rather than regenerating or re-fetching the response through more expensive computing and/or network operations. Additionally, even if the response to the request 202 is not available in cache, in certain situations, the response to the request can be generated through various processes and events described in more detail below herein such that the response to the request can then be stored in cached and subsequently made available to clients requesting data in the response.

A resolve cache function 204 may be performed when the request 202 is received. The resolve cache function 204 allows cached data to be returned from the caches 206 when the response to the request 202 is available in the caches 206. To obtain a cached response to the request 202, a request for cached data 104 is sent. In the embodiment shown in FIG. 2, the request for cached data 104 may be sent to the first cache 102-1 which as described above maybe a faster and/or cheaper cache. If the first cache 102-1 includes the response to the request 202 then the first cache 102-1 may return the response and prevent the request for cached data 104 from continuing to subsequent caches such as the caches 102-2 and 102-N. If the response to the request 202 is not available in the first cache 102-1 then the request for cached data 104 may be passed to a subsequent cache as described above in conjunction with the description of FIG. 1. As described previously, subsequent caches can continue to check for a response to the request 202 until a response is found or until each of the caches has been checked for a response.

FIG. 2 illustrates the decision block 208. The decision block 208 indicates that if a response is stored in one of the caches, then the response is sent to a client as indicated at 210. If a response is not stored in one of the caches, then various actions may be performed as illustrated at the events 212 to generate or retrieve a response from another location.

As mentioned, FIG. 2 illustrates events 212. Events may be various activities that are performed to generate data as a response to the request 202 and/or to obtain data in response to the request 202. For example, the events 212 may include activities performed by an application level component such as asp.NET. Events 212 may include database retrieval functions for gathering data stored in a database to be used as data to satisfy the request 202. Some embodiments allow events to be performed at any appropriate level. For example, events 212 may be performed at a kernel level, a system level, and/or an application level.

FIG. 2 further illustrates an update cache action 214. When data has been generated or retrieved by the events 212, the data may be stored in one of the caches 206. This allows the data to be used as a response to a subsequent request requesting the data. As described previously, the data 106 may be sent to a first cache 102-1. The first cache 102-1 references the cache policy 108. If the cache policy 108 dictates that the data 106 should be cached and the first cache 102-1 is able to cache the data 106, then the first cache 102-1 caches the data 106. Then the first cache 102-1 indicates to subsequent caches that the data 106 should not be cached. In one embodiment, this may be accomplished by marking the data 106 as data that should not be cached. Alternatively, the first cache 102-1 may send a separate message to subsequent caches, such as caches 102-2 and 102-N to not cache the data 106.

FIG. 2 further illustrates a handler 216. The handler 216 may be associated with computer hardware and software represented at the events 212. The handler 216 is able to provide policy information to the cache policy 108. In particular, the handler 216 may have information available defining what particular types of data should be cached when generated by the events 212. This information can be conveyed to the cache policy 108 by the handler 216.

Figure 3:
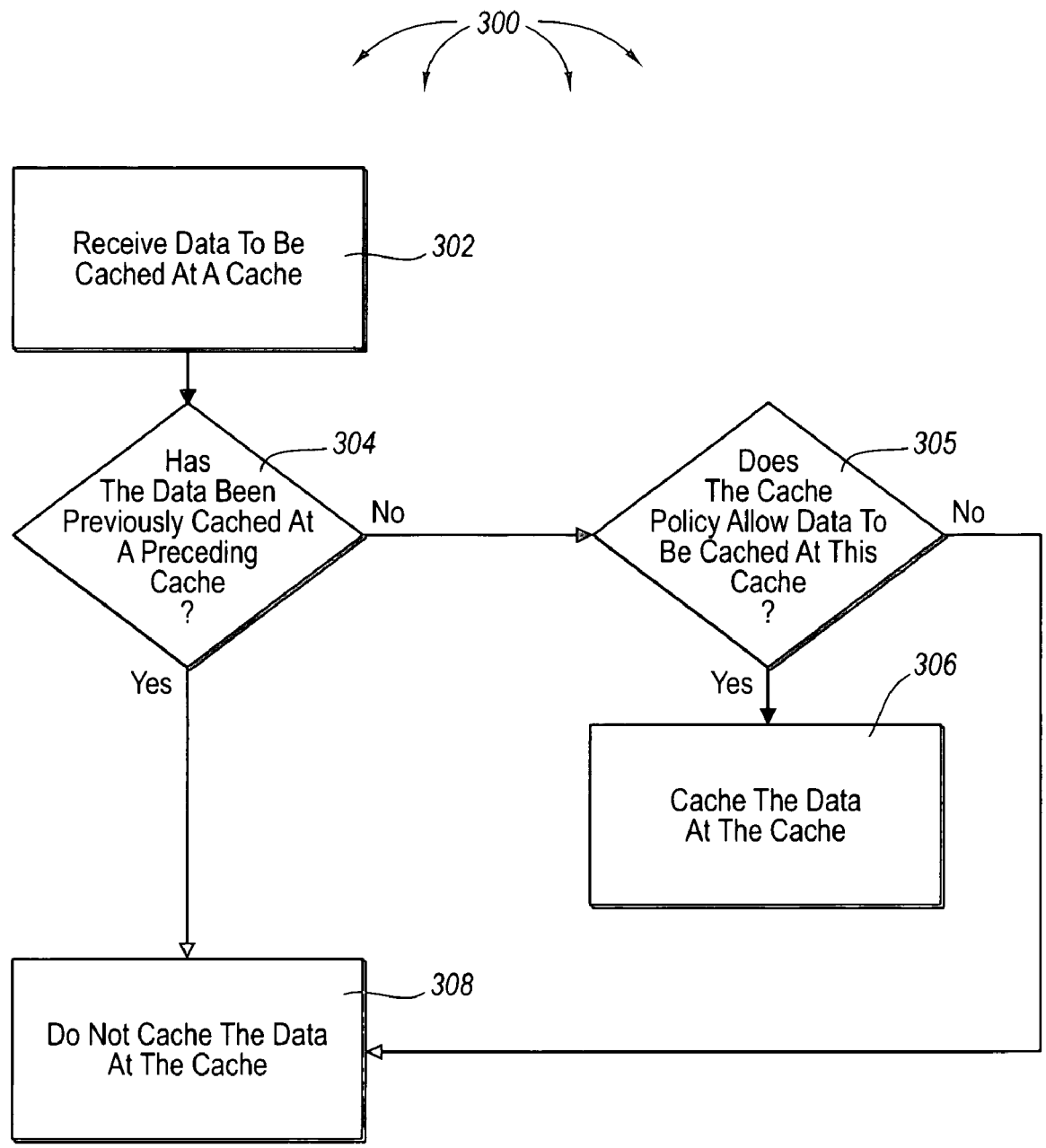
FIG. 3 illustrates a method of caching data.

Referring now to FIG. 3, a method 300 is illustrated for storing data. The method 300 may be practiced for example in a computing environment including a server system that provides data to client systems. The server system includes a number of caches for storing data. The method 300 includes a number of acts. For example, the method 300 includes receiving data to be cached at a cache (act 302). The method 300 further includes determining that the data has not been previously cached at a preceding cache (act 304). If the data has not been previously cached at a preceding cache, the method 300 illustrates determining if the cache policy allows the data to be cached at this cache (act 305). If the cache policy allows the data to be cached at this cache, the method 300 illustrates that the data is cached at the cache (act 306). Otherwise, the data is not cached at the cache (308).

Some embodiments allow for the data to be forwarded to a subsequent cache. The data may be marked such that subsequent caches do not cache the data. For example, the data may be marked as data not to be cached so that subsequent caches do not cache the data. Alternatively, the cache may communicate to subsequent caches that the data should not be cached.

As described previously herein, the preceding cache may be a less costly cache than the cache. For example, as shown in FIG. 1, the first cache 102-1 may be less costly in that it is a faster cache or requires less resources than the second cache 102-2. In a similar vein, the subsequent cache may be a more costly cache than the cache. As such, the less costly and/or fastest caches have an opportunity to store data before more costly and/or slower caches.

The method 300 may further include determining if the cache includes functional capability for caching the data. This may be performed at act 305 in one example. If the cache includes functional capability for caching the data then caching the data at the cache (act 306) is performed. For example, and referring once again to FIG. 1, the first cache 102-1 can reference the cache policy 108 to determine what types of data should be cached. The first cache 102-1 can then reference its own caching capabilities to determine if it has the capabilities to cache the data.

As such, determining if the cache includes functional capability for catching the data may include comparing the functional capability of the cache with a common set of settings in an object, such as the cache policy 108, applicable to the number of caches.

As described previously, determining if the cache includes functional capability for caching the data may include comparing the functional capability of the cache with a set of coordinated settings applicable to the plurality of caches. The coordinated settings may be a collection of individual setting for each of the caches in the plurality of caches that are able to share information. As such, a preceding cache may use policy settings from a subsequent cache in determining if the preceding cache is able to cache data.

The method 300 may include determining if the data should be cached by consulting a cache policy and caching the data at the cache (act 306) if the cache policy indicates that the data should be cached. This may be performed for example at act 305. As described above, the cache policy 108 includes information dictating what types of data should be cached at the caches in the plurality of caches.

The method 300 may be such that receiving data to be cached at a cache comprises receiving the data from a preceding cache. For example, a cache may receive the data from a preceding cache if the preceding cache is not able to cache the data due to functional limitations.

As described previously, the caches may have varying functionalities where faster caches are accessed prior to slower caches. As such, in one embodiment, the cache may be a web server cache and the subsequent cache may be an application level cache. Similarly, the cache may be a native cache and the subsequent cache may be a managed cache.

Figure 4:
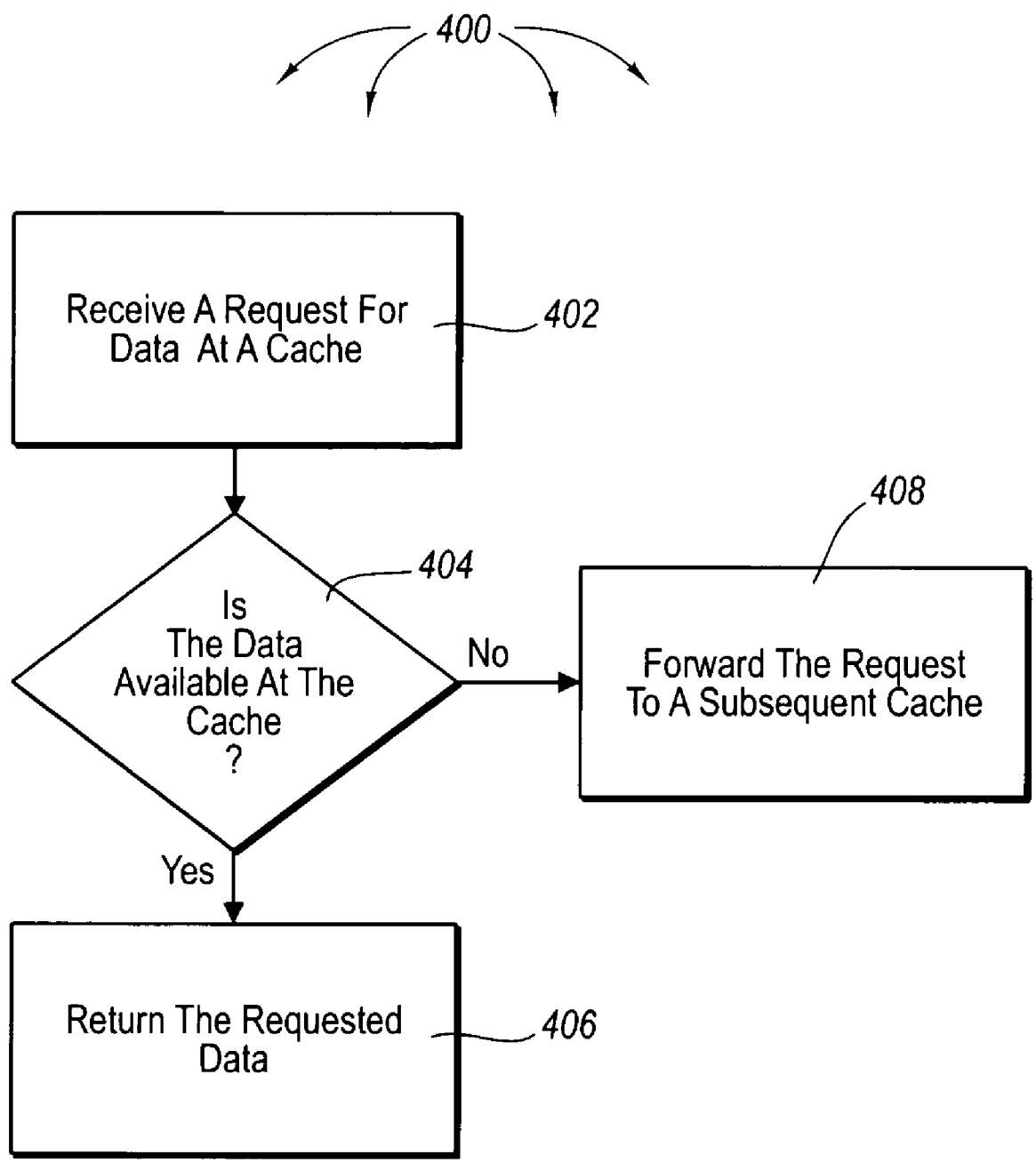
FIG. 4 illustrates a method of retrieving cached data.

Referring now to FIG. 4, a method 400 is illustrated. The method may be practiced for example in a computing environment including a server system that provides data to client systems. The server system includes a number of caches for storing data. The method includes various acts for providing cached data requested by a client. The method includes receiving a request for data at a cache (act 402). For example, as illustrated in FIG. 2, a request 104 may be received.

The method further includes determining if the data is available at the cache (act 404). For example, the first cache 102-1 if the data are requested by the request for data 104 is available at the first cache 102-1. If the data is available at the cache, the requested data is returned (act 406). For example, FIG. 2 illustrates sending a response to the client 210. If the data is not available at the cache, the request is forwarded to a subsequent cache (act 408). For example, the request 104 may be forwarded to the second cache 102-2.

As described in other embodiments herein, the cache may be faster than subsequent cache.

The method of claim 400 may further include generating or retrieving the data from a location other than the plurality of caches if the data is not available at the plurality of caches. For example, as illustrated in FIG. 2, various actions may be performed as illustrated by the events 212 to generate the data or to retrieve the data such as from a database or other data source.

When data has been retrieved or generated, the method 400 may further include acts for providing the data to the cache, determining that the data has not been previously cached at a preceding cache from among the number of caches, and if the data has not been previously cached at the preceding cache from among the number of caches as determined in the step of determining that the data has not been previously cached, caching the data at the cache.

Additionally, generating or retrieving the data may include providing cache policy information to the plurality of caches specifying data that should be cached at the plurality of caches.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment including a server system that provides data to client systems and wherein the server system comprises a plurality of caches for storing data, a method of caching data requested by a client at a least expensive cache first, the method comprising acts of:
   receiving data to be cached at a cache;
   determining that the data has not been previously cached at a preceding cache; and
   when the data has not been previously cached at a preceding cache, then
      determining whether the cache includes functional capability for caching the data based on settings defining what particular types of data should be cached when generated by events, and by (i) comparing the functional capability of the cache with a common set of such settings as stored in an object applicable to the plurality of caches, the common set of such settings applying to all of the plurality of caches, and (ii) comparing the functional capability of the cache with a set of coordinated settings applicable to the plurality of caches, wherein the set of coordinated settings defines what particular types of data should be cached when generated by events and that are a collection of individual settings for each of the caches in the plurality of caches, and wherein comparing the functional capability of the cache with the common set of settings and the coordinated settings, includes considering at least the speed and/or expense of the cache; and
   then caching the data at the cache once the functional capability for caching the data has been determined.

2. The method of claim 1, wherein the cache at which the data is stored is a subsequent cache, and the preceding cache is a less costly cache than the subsequent cache.

3. The method of claim 1, wherein the cache is a subsequent cache that is hierarchically preceded by a preceding cache, and wherein receiving data to be cached at a cache comprises receiving the data at the subsequent cache, which data is received from the preceding cache which forwards the data to the subsequent cache after determining that the preceding cache determined that it will not cache the data.

4. The method of claim 1, wherein:
   the common set of settings and the set of coordinated settings are accessed by consulting the object, which object is a cache policy object; and
   caching the data at the cache is performed when the settings stored in the cache policy object indicate that the data should be cached.

5. The method of claim 1, wherein receiving data to be cached at a cache comprises receiving the data from a preceding cache.

6. The method of claims 2 or 5, wherein the preceding cache is a web server cache and the subsequent cache is an application level cache.

7. The method of claims 2 or 5, wherein the preceding cache is a native cache and the subsequent cache is a managed cache.

8. A computer readable medium having a plurality of data structures stored thereon, the plurality of data structures comprising:
   a plurality of hierarchically related caches comprising,
      a first cache having a first speed; and
      a second cache having a second speed that is slower than the first cache, and wherein the second cache is structured because of its lower speed lower in the hierarchy than the first cache, so that the first cache receives data and requests for data prior to the second cache; and
   a policy object which holds data defining settings for the plurality of caches and in terms of what particular types of data should be cached when generated by the events, and so that when data is sent to a cache, that cache can then either cache the data or not by referencing the policy object for that cache, and
   wherein the first cache and the second cache are structured such that when data that is to be cached is determined by the first cache in the hierarchy, and by using the policy object, to be of type that cannot be cached by the first cache, the data is then automatically passed to the second, hierarchically lower cache for determination by the second cache, using the policy object, whether it can be cached at the second cache.

9. The computer readable medium of claim 8, further comprising computer executable instructions for generating and/or retrieving data.

10. The computer readable medium of claim 8, further comprising computer executable instructions for generating policy information to be stored in the policy object.

11. In a computing environment including a server system that provides data to client systems and wherein the server system comprises a plurality of caches for storing data, a computer program product comprising a computer storage media containing executable instructions for implementing a method of caching data requested by a client at a least expensive cache first, and wherein the method is comprised of the acts of:

receiving data to be cached at a cache;

determining that the data has not been previously cached at a preceding cache; and when the data has not been previously cached at a preceding cache, then determining whether the cache includes functional capability for caching the data based on settings defining what particular types of data should be cached when generated by events, and by (i) comparing the functional capability of the cache with a common set of such settings as stored in an object applicable to the plurality of caches, and (ii) comparing the functional capability of the cache with a set of coordinated settings applicable to the plurality of caches, wherein the set of coordinated settings defines what particular types of data should be cached when generated by events and are a collection of individual settings for each of the caches in the plurality of caches, and where in comparing the functional capability of the cache with the common set of settings and the coordinated settings, includes considering at least the speed and/or expense of the cache; and then caching the data at the cache once the functional capability for caching the data has been determined.

* * * * *